United States Patent [19]
Walton

[11] 3,816,709
[45] June 11, 1974

[54] ELECTRONIC IDENTIFICATION AND RECOGNITION SYSTEM

[76] Inventor: Charles A. Walton, 20 E. Main St., Los Gatos, Calif. 95030

[22] Filed: May 14, 1973

[21] Appl. No.: 359,912

Related U.S. Application Data

[62] Division of Ser. No. 212,281, Dec. 27, 1971, Pat. No. 3,752,960.

[52] U.S. Cl. ....................... 235/61.11 H, 340/152 T
[51] Int. Cl. ............................................. G06k 7/08
[58] Field of Search ................ 235/61.11 H, 61.7 B; 340/149 A, 152 T, 258 C; 343/6.5 SS, 6.8 R

[56] References Cited

UNITED STATES PATENTS

| | | | |
|---|---|---|---|
| 2,817,012 | 12/1957 | Kendall | 343/6.5 SS |
| 3,137,847 | 6/1964 | Kleist | 343/6.5 SS |
| 3,521,280 | 7/1970 | Janco et al. | 343/6.5 SS |
| 3,671,721 | 6/1972 | Hunn et al. | 340/258 C |

*Primary Examiner*—Daryl W. Cook
*Attorney, Agent, or Firm*—Schatzel & Hamrick

[57] ABSTRACT

An electronic identification and recognition system for identifying or recognizing an object carrying an electrically passive circuit. The system comprises an active electrical signal generation network with a sensing coil for generating a magnetic field within the proximate area of said sensing coil; and an object having a passive electrical circuit with a coded resonant frequency, said object being adapted to move relative to and from said proximate area and adapted for inductive coupling with said active system. The active generation network being further adapted to generate digital control signals responsive to the resonant frequency of the passive object when said passive object is inductively coupled with said active system.

5 Claims, 11 Drawing Figures

ELECTRONIC IDENTIFICATION AND RECOGNITION SYSTEM

This is a division of application Ser. No. 212,281 filed Dec. 27, 1971, now Pat. No. 3,752,960.

BACKGROUND OF THE INVENTION

The present invention relates to a data acquisition system for electronically identifying and recognizing objects. Exemplary applications for identification and recognition systems may include product handling, vehicle identification, or locks and keys. For example, it is commonly desirable to identify a vehicle, or an object, as it passes within the vicinity of a sensor system. The identification result may be in the form of an electronic signal which may be displayed or transmitted to another system for further handling of the identified object. In some applications of identification and recognition systems, it may be desirable to identify various members of a group of objects as the objects pass by the vicinity of a given location, or conversely, it may be desirable to have a moving system adapted to identify the objects or physical locations as the system is transported past the objects or locations.

Heretofore, there have been various moving object identification and recognition systems. The prior art includes systems incorporating complex optical scanning systems; systems incorporating magnetic-coding; microwave systems using microwave transmitters and receivers; various systems employing mechanical touching of the object to be sensed; and mechanically coded interaction systems of keys and parts inside a lock.

SUMMARY OF THE DESCRIPTION

The present invention relates to an identification and recognition system employing inductive coupling between a detector and the object or objects to be identified or recognized.

It is an objective of the present invention to provide an electronic identification and recognition system adapted to identify an object having an electrical passive circuit and to indicate the identification of said object by digital electrical signals.

It is an objective of the present invention to provide a system which does not require mechanical engagement of the object to be identified with the detector and does not require optical or television systems.

It is an objective of the present invention to provide a system which is economical and capable of identifying objects rapidly.

It is a further objective of the present invention to provide a system adapted to identify or to recognize matching of a remote coded object with a sensor designed to react positively to said objects having a pre-specified code and negatively to objects having other than said pre-specified code.

The electronic identification and recognition system of the present invention includes an active network and a passive network. The system is adapted to identify an object carrying an electrically passive circuit when said object is positioned within the effective coupling zone, but not necessarily touching a sensor device of the active network. For purposes of explanation, "passive" means a circuit having a resonant frequency but not having a power supply of its own. The passive object includes a passive reactive circuit adapted to resonate at a particular frequency when excited by the magnetic field of a sensor of the active part of the system. The active part of said system is adapted to generate an electrical field within the proximity of said sensing coil. When said passive circuit is brought within the effective coupling zone of the coil the active network may identify the resonant frequency of the passive circuit.

In an exemplary embodiment, the active sensor network generates an electrical field sweeping through a range of frequencies, which range encompasses the resonant frequency of the passive object to be identified. The object includes an inductive element which may be inductively coupled to the sensing coil when said object is brought within the proximity of the sensing coil. The active network senses variations in the response field occuring as the sweep frequency of the active network passes through the resonant frequency of the passive object. The resonant frequency of the passive object is manifested as a phase change, amplitude change and a change in the direction of the magnetic field.

For sensing phase change, the active network includes a phase sensitive detector engaged to a zero phase or crossover detector. The zero phase or crossover detector emits a control pulse responsive to the phase reversal. The control pulse initiates a frequency measurement network for a short, accurate time interval and within this time interval the oscillator frequency is measured or counted. The count represents the resonant frequency value of the passive object. The count value is available in digital form and may be displayed and/or utilized for further processing of the passive object.

In another exemplary form, the active system is adapted to excite the passive object by electrical impulses. The impulses are transmitted through a sensing coil functioning as a primary coil inductively coupled to an inductive coil of the passive object. The inductive coil of the passive object serves as a secondary coil. The passive circuit of the passive object oscillates or "rings" for a time interval after receipt of the impulse train. A time gate and counter respond to the ring to measure the frequency value of said ring.

In another form the system is adapted for code matching, wherein the active circuitry includes one or more tuned circuits tuned to a preset frequency. The tuned circuits are in turn stimulated by an oscillator, while the passive circuits are simultaneously stimulated. If the resonant frequency of the internal tuned circuit matches the resonant frequency of the passive circuits the code is considered matched and a GO signal is emitted. If there is no match, a NO-GO signal is emitted.

In another form, the system is adapted for code matching, wherein the active circuitry includes one or more voltage comparators set to preset comparison voltages. When the voltage sweep which causes the frequency to sweep, passes a preset comparison voltage, the comparator emits a pulse. If the pulse overlaps in time with a pulse caused by resonance of the passive network a GO signal is emitted, also referred to elsewhere as OK or ALLOW ENTRY. If there is no match, a NO-GO signal is emitted.

In a spontaneous oscillation embodiment of the invention, the detection circuits of the active network are coupled to a drive circuit. When the passive object is within the proximity and sensed, positive feedback with a gain greater than unity exists and oscillations occur within the active network. The oscillation frequency is dependent on the reactive characteristics of the passive object. The oscillation frequency is measured to determine the frequency value of the passive object.

DESCRIPTION OF PREFERRED EMBODIMENTS

Figure 1:
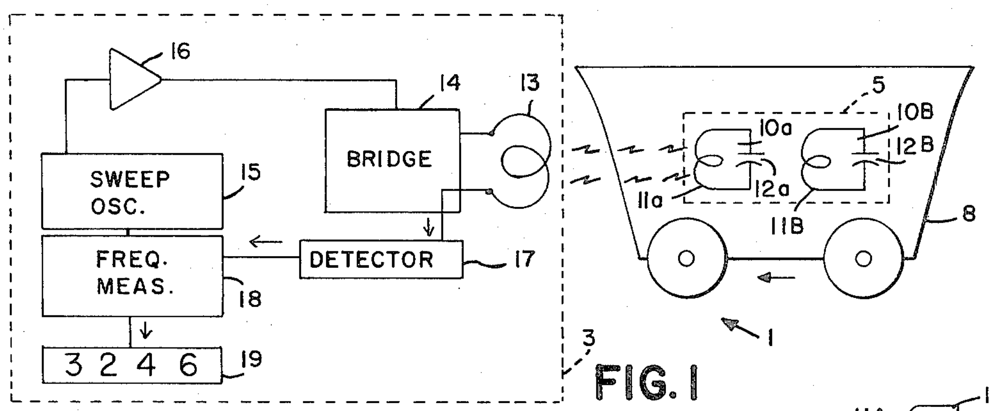
FIG. 1 is a block schematic diagram of an identification-recognition system incorporating the teachings of the present invention and adapted to identify a passive object affixed to a moving vehicle.

FIG. 1 diagrammatically illustrates in block diagram form an identification-recognition system, referred to by the general reference character 1 and incorporating the teachings of the present invention. The system 1 includes an active network 3 and a passive network 5. As illustrated, the passive network 5 is in the form of an identification tag carried by a vehicle or baggage 8. The tag 5 carries two passive circuits 10A and 10B. The circuit 10A includes an inductor 11A and a capacitor 12A joined to form an electrical resonant circuit. The circuit 10B carries an inductor 11B and a capacitor 12B to form an electrical resonant circuit. The inductors 11A and 11B function as a secondary of a transformer and are inductively coupled to a sensing coil 13 of the active network 3. The values of the components of the passive circuits 10A and 10B are selected such that their circuit resonant frequency serves as an identification of the vehicle 8. The components of the various passive circuits 10A and 10B may be selected such that the circuits have any one of various frequencies so as to serve as an identification or recognition of a particular object. The sensing coil 13 of the active network 3 functions as a primary coil and is excited with an alternating current signal from a bridge network 14. The bridge network 14 is excited by a sweep oscillator 15 generating alternating current signals over a frequency range $f_1 - f_{10}$. The bridge 14 tends to isolate the signals of said oscillator 15 from the received signals on the sensing coil 13, which received signals result from field changes as the passive circuits 10A or 10B are coupled to the coil 13. The signals of the oscillator 15 are amplified by a drive amplifier 16, and, in turn, applied through the bridge 14 to the sensing coil 13. The output of the bridge network 14 is connected to a detector network 17. The output signal from said bridge 14 is a function of the electrical load reflected by the passive circuit 10A of the passive network 5, as said circuit 10A moves within the proximity of the sensing coil 13, such that there is inductive coupling between the sensing coil 13 and the passive circuit. The electrical load of said circuit 10A is in turn a function of the frequency of the signal on the primary coil 13 inductively coupled to the inductor 11A. The detector network 17 is adapted to detect the frequency signals of the bridge 14, which signals are representative of the resonant frequency of the circuit 10A. The output of the detector 17 is measured by a frequency measurement network 18 and displayed in digital form by a digital display 19.

Figure 2:
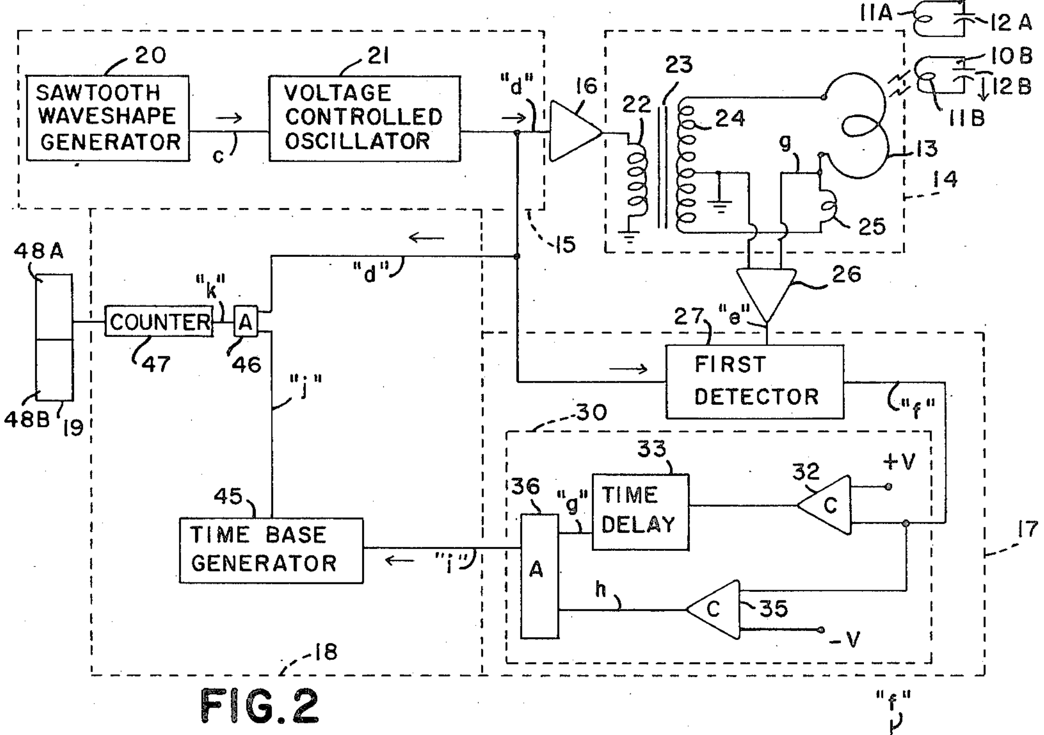
FIG. 2 is a diagrammatic block diagram of the system of FIG. 1.

FIG. 2 depicts the system 1 in greater detail. The sweep oscillator network 15 includes a sawtooth wave generator 20 (also known as a ramp generator) which generates a wave similar to the wave $c$ of FIG. 3. The wave $c$ increases linearly in amplitude relative to time during the time period $t_1 - t_{10}$, and automatically resets when the amplitude reaches a certain value at time $t_{10}$. The wave $c$ excites a voltage controlled variable frequency oscillator 21. The frequency of the oscillator 21 is thus varied from an initial frequency $f_1$ coinciding with time $t_1$ when $c$ is minimum to a final value $f_{10}$ coinciding with time $t_{10}$ when $c$ is maximum. The range of frequencies $(f = f_{10} - f_1)$ of the resultant signal $d$ includes the resonant frequency of the passive circuit 10A.

The oscillator signal $d$ is fed to the drive amplifier 16 which drives a primary winding 22 of a transformer 23 within the bridge network 14. The transformer 23 carries a center tapped secondary winding 24. The two halves of the secondary winding 24 each form legs of a bridge circuit with the sensing coil 13 and an inductor 25 forming the other two legs. The output of said bridge 14 is taken at the center tap of the secondary winding 24 and the junction of the coil 13 and the inductor 25. The output of said bridge network 14 extends to a sense amplifier 26. In operation, the center tapped secondary winding 24 provides equal but opposite excitation to the coil 13 and the inductor 25. This, in turn, provides a balancing effect tending to minimize undesired common mode voltages and phase effects which otherwise arise at the input of the sense amplifier 26. With the sensing coil 13 inductively coupled to the inductor 11A, a signal from the passive network 5 is inductively coupled to the sensing coil 13. The passive network 5 unbalances the bridge network 14 and the unbalance signal appears at the input of the amplifier 26. The sense amplifier 26 receives the bridge output signal, illustrated by waveform $e$ of FIG. 3. The sense amplifier 26 amplifies the magnitude of said signal $e$. The inductor 25 is selected of a value adjusted such that the signal $e$ is at reference zero when there is no passive circuit within the proximity of the sensing coil 13.

The output of the amplifier 26 is fed to the detector network 17, which includes a first detector 27. The detector 27 is also adapted to receive the output of the voltage controlled oscillator 21 and the signal $d$. The detector 27 is in the form of a phase sensitive detector in which the signal $e$ phase modulates a reference signal. The detector 27 receives the reference phase signal $d$ and, as hereinafter discussed, shifts the phase plus 90° as shown by the waveform $d$ of FIG. 3. The first detector 27 detects the phase relationship of the signal $e$ and the reference signal $d$. The output of the detector 27 is in the form of a variable voltage signal, as illustrated by the signal $f$ of FIG. 3. The signal $f$ assumes one polarity for signals of a frequency below the resonant frequency of the circuit 10A and the opposite polarity for signals of a frequency above the resonant frequency of the circuit 10A. The reversal of polarity of the signal $f$ results from the fact that the passive circuit 10A appears as a predominantly capacitive reactance on one side of the resonant frequency and inductive reactance on the other side of the resonant frequency. At the crossover of the signal, the passive circuit 10A is at resonance. Though the detector 27 has been described as a phase sensitive detector, a detector adapted to function as an amplitude sensitive detector may be incorporated. However, it has been found that a phase sensitive detector is less responsive to extraneous noise disturbances. Also, with a phase sensitive detector, the point of resonance is established by the zero crossover. Zero crossover tends to be more sharply detectable than the rounded wave shape of an amplitude envelope. Because the amplitude of the response signal $e$ varies with the distance of the passive circuit from the sense coil 13, an automatic gain control circuit (not shown) may be employed.

Figure 3:
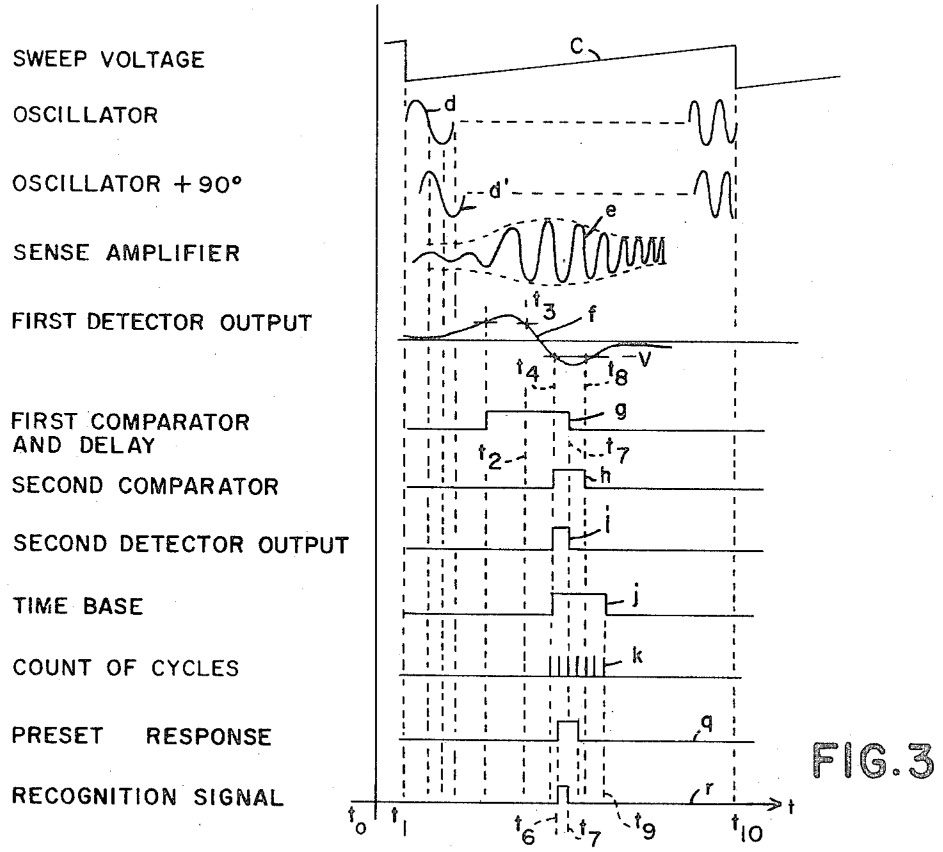
FIG. 3 illustrates the wave shapes and time relationship of signals at various points of the circuitry of FIG. 2.

The output signal $f$ is further analyzed within the detector network 17 by a second detector 30 circuit. The detector circuit 30 is adapted to respond to the change through the zero reference of the signal $f$ and not to the mere presence at the zero reference. The detector 30 serves as a zero crossover detector adapted to respond to the output of the first detector 27 and a voltage "V" of a preset absolute value. The detector 30 includes a comparator 32 adapted to receive and compare the signal $f$ against the positive portion of the absolute voltage V also applied to the input. The output of the comparator 32 is in the form of a positive signal when the signal $f$ exceeds +V. At phase reversal the signal $f$ passes below the value of +V and through zero reference. The output of the comparator 32 then goes to zero. The overall logic output of the comparator 32 is delayed in its fall to zero by a fall time delay network 33 such that the output of the network 33 assumes a waveform $g$ as illustrated in FIG. 3. The second detector network 30 further includes a comparator 35 in which the signal $f$ is compared against the negative portion of the absolute voltage, i.e. −V. If the signal $f$ goes more negative than −V, the output of the comparator 35 is positive as illustrated by the waveform $h$ of FIG. 3. The fall delay circuit 33 has a sufficient time delay such that if the output of the comparator 35 goes positive, a positive signal $g$ from the delay circuit 33 is still present when $f$ goes negative and there will be a time overlap. The time delay network 33 and comparator 35 are both common to an AND logic gate 36. Thus, while both the signals $g$ and $h$ are positive, there will be an output of the gate 36, as illustrated by the waveform $i$ of FIG. 3. The pulse signal $i$ represents the output of the detector network 17.

The signal $i$ is applied to the frequency measurement network 18, which includes a time base generator 45. The output of the generator 45 is common to a logic AND gate 46, also common to the output of the voltage controlled oscillator 21. The gate 46 is common to a counter 47. In operation, the time base cycle of the generator 45 is typically a fraction of the total sweep generator cycle, e.g. 0.01. The time base cycle, as represented by waveform $j$ of FIG. 3, is typically generated by counting the cycles from an accurate source such as a crystal over a preset quantity of counts. The time base generator 45 opens the gate 46 and allows cycles of the signal $d$ from the oscillator 21 to pass. A count of cycles, as illustrated by the waveform $k$ of FIG. 3, appears at the output of the gate 46. The quantity of cycles accumulated in the counter 47 during the time cycle is representative of the frequency at which the passive circuit 10A responded. Although the frequency within the frequency range of the oscillator 21 is constantly increasing, the difference of oscillator frequency from the resonant frequency of the passive circuit applies to all the passive devices 10 and so is self-cancelling and compensated for in the system calibration.

After the frequency of the circuit 10 has been measured and the representative value counted, the contents of the counter 47 are transferred to the display 19. The display 19 is in the form of a pair of storage and display registers 48A and 48B. The frequency of the passive circuit 10A is displayed by the register 48A. Then the counter 47 is cleared. If there are two passive circuits, 10A and 10B, the value of the second circuit 10B is stored and displayed in register 48B. The overall result is identification of the passive circuits 10A and 10B, which together may identify the vehicle 8 or match a preset code.

Figures 4, 5:
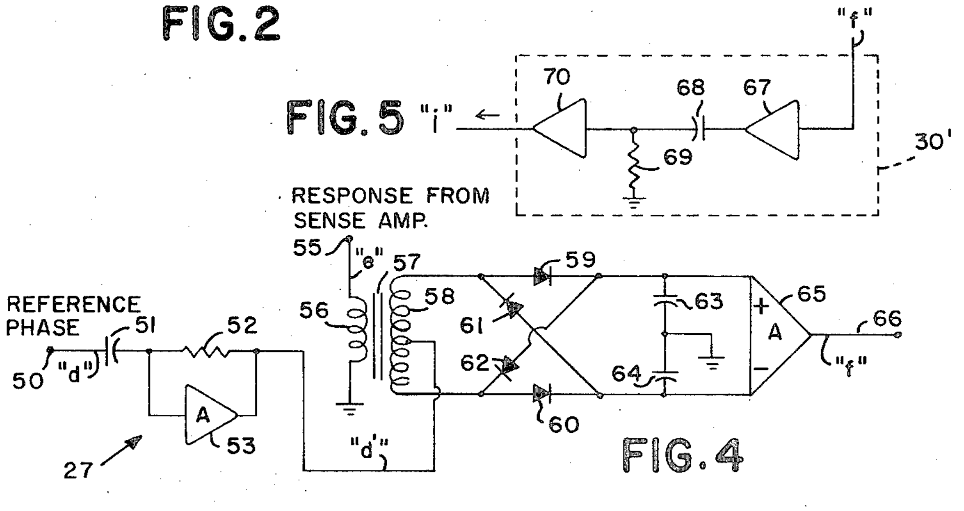
FIG. 4 is a schematic diagram of a phase sensitive detector of the system of FIG. 2.
FIG. 5 is an alternative embodiment of the second detector circuit of FIG. 2.

FIG. 4 illustrates a circuit diagram of a phase sensitive detector which may be incorporated for the detector 27. The detector 27 is adapted to receive the signal $d$ and the signal $c$ and generate a signal $f$ representing the phase relationship of said two signals. The detector 27 includes an input terminal 50 to receive the reference signal $d$ from the oscillator 21. Since it is desired to find the response signal which is 90° out of phase with the oscillator signal $d$, the signal $d$ is shifted in phase plus 90° by means of an operational differentiator. The operational differentiator includes a series capacitor 51, a feedback resistor 52 and an amplifier 53. The output from the operational differentiator, as represented by the signal $d$ of FIG. 3 is 90° advanced in phase relative to the reference signal $d$. A second input terminal 55 receives the signal $e$ from the amplifier 26, which signal represents the response of the passive circuit 10A. The signal $e$ tends to be of leading phase angle if the passive circuit 5 is predominantly capacitive and of a lagging phase angle if the passive circuit is predominantly inductive at a certain frequency. The terminal 55 extends to a primary winding 56 of a transformer 57 having a center tapped secondary winding 58. The center tap of the winding 58 extends to the junction of the resistor 52 and amplifier 53 of the operational differentiator and receives the phase shifted signal *d*. The secondary winding 58 joins a full-wave bridge having a unidirectional conductive device in the form of a diode 59 extending from one side of the winding 58 with the anode common to the winding; a second unidirectional conductive device in the form of a diode 60 extending from the other side of the winding 58 with the anode common to the winding; a third unidirectional conductive device in the form of a diode 61 extending across the diodes 59 and 60 with the anode of the diode 61 common to the cathode of the diode 60 and the cathode of the diode 61 common to the anode of the diode 59; and a fourth unidirectional conductive device in the form of a diode 62 with the anode of the diode 62 common to the cathode of the diode 59 and the cathode of the diode 62 common to the anode of the diode 60. A pair of capacitors 63 and 64 are tied in series and extend across the bridge with the common junction of the capacitors 63 and 64 tied to ground reference. The capacitors 63 and 64 further extend to the positive and negative input terminals respectively, of a differential amplifier 65. The differential amplifier 65 has an output terminal 66. In operation, the magnitude of the signal *d* exceeds that of the signal on the winding 58. When the resultant signal on the winding 58 is positive, both the diodes 59 and 60 conduct and signal induced from the primary winding 56 is coupled in phase to the output capacitors 63 and 64. If the signal on the winding 58 is positive at the time, i.e. in step with the signal *d* which is 90° leading the reference, the voltage on the capacitors 63 and 64 is positive. If the signal on the winding 58 is negative at the time the voltage *d* is negative, the voltage on the capacitors 63 and 64 is negative.

When the voltage *d* is negative, diodes 59 and 60 are turned off and the diodes 61 and 62 conduct. In typical operation, the phase of the signal *e* from the sense amplifier 26 appearing on the primary winding 56 will also have reversed and the voltage on the capacitors 63 and 64 will again be positive. Thus, a positive output voltage *f* at the terminal 66 represents a positive phase angle from the passive circuit 10A. A negative phase angle from the passive circuit 10A will cause a negative voltage to appear on the capacitors 63 and 64. The differential amplifier 65 responds to the difference of the potential between the capacitors 63 and 64 such that the output at the terminal 66 is the amplified difference of the two voltages and, therefore, reflects an averaged and smoothed response to the symmetrical sides of the phase sensitive detector.

In viewing the wave shapes of FIG. 3, it may be noted that the sweep voltage *c* and frequency of the wave *d* increase with time and are periodically reset. The bridge circuit 14 and amplifier 26 generate the signal *e* of a frequency equal to the oscillator frequency. The signal *e* increases in amplitude as the resonance frequency of the passive circuit 10 is approached and decreases afterwards. A phase shift from leading to lagging or vice versa, occurs as the resonant point is passed, as indicated by the output *f* of the phase sensitive detector 27. The pulse *i* is generated by the zero crossover detector circuits 30. The time base cycle for the counter 47 is started by the pulse *i* and its time duration is typically set by counting a preset number of cycles from an accurate frequency source such as a crystal. The trace *k* represents the counted cycles of the oscillator 21 during the time period of the time base pulse *j*.

FIG. 5 illustrates an alternate embodiment 30′ of the crossover detector network 30 of FIG. 2. The signal *f* is amplified and differentiated by a capacitor 68 and resistor 69. The differentiated signal is amplified and limited by an amplifier 70. The point where the signal *f* passes through zero is also the point where its rate of change is greatest and, consequently, its derivative is maximum. The resultant output *i* is a pulse coinciding closely in time with the zero crossover of signal *e*.

Figure 6:
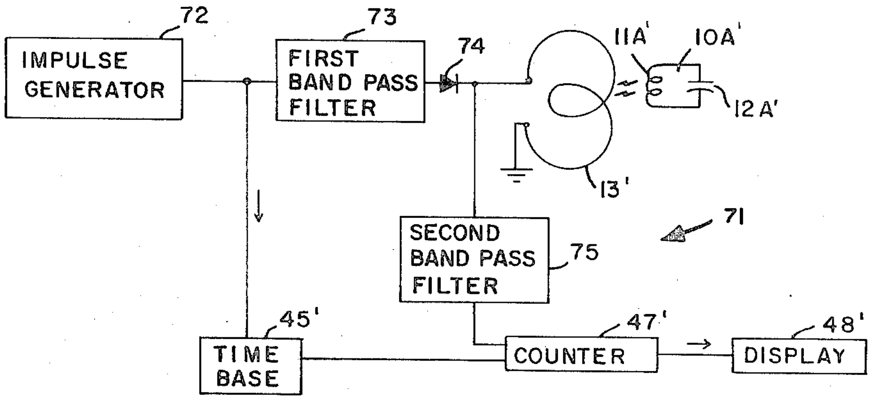
FIG. 6 illustrates an alternative embodiment of the identification-recognition system of the present invention adapted to generate impulses as a source of multiple frequency signals.

FIG. 6 is a block diagram of an alternative embodiment of an identification and recognition system of the present invention and referred to by the general reference character 71. Those elements common to FIG. 2 carry the same reference numeral distinguished by a prime designation. The system 71 is adapted such that the active system excites the passive circuit 10A′ with impulses. An impulse generator 72 generates pulses within a range of frequencies. The pulses are transferred to a first band pass filter 23 joined to a diode 74 in turn joined to the sensing coil 13′. The detector means is in the form of a second band pass filter 75 extending between the coil 13′ and the counter 47′. The counter 47′, as in FIG. 1, is tied to the time base network 45′ and the display 48′. The passive circuit 10A′ is stimulated to oscillate at its natural resonant frequency determined by the values of the inductor 11A′ and capacitor 12A′. The passive circuit 10A′ has a high Q such that the oscillations persist for a period of time after the impulse. This is sometimes referred to as "ringing". The diode 74 prevents the drive circuits from loading down the signal induced in the sensing coil 13′ from the ringing. The bandpass filters 73 and 75 have frequency passbands which include the range of frequencies of the passive circuit 10A′ and reject frequencies outside said band. The signals received from the ringing of the passive circuit 10A′ pass through the filter 75 to the counter 47′. The cycles are counted for a period established by the time base generator 45′. The result is a measure of, or identification of, the resonant frequency of the passive circuit 10A′ and is displayed and stored in digital form by the display 48′.

Figures 7, 8:
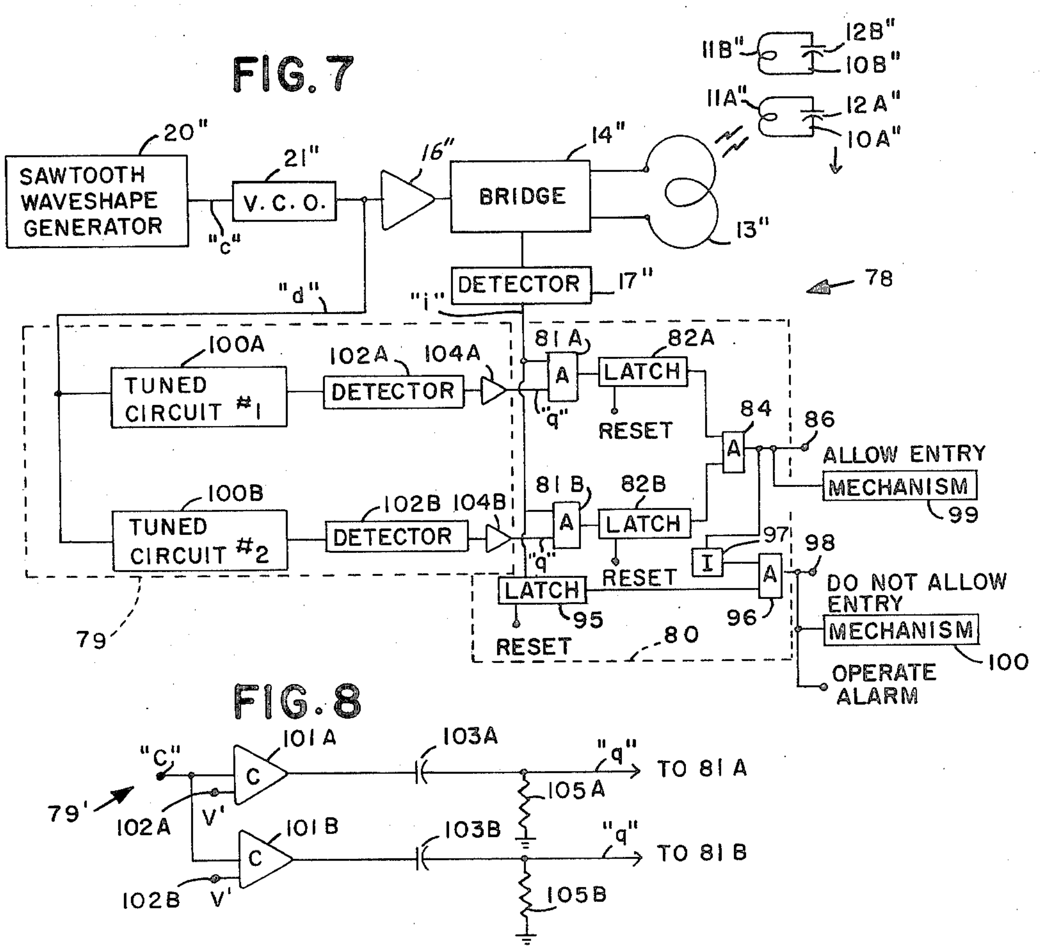
FIG. 7 illustrates an alternative embodiment of the present invention adapted to recognize a match between internally preset frequencies or code within an active part of the system with the resonant frequency of a passive object.
FIG. 8 illustrates an alternative internal preset recognition code network of the system of FIG. 7.

FIG. 7 illustrates an alternative embodiment of an identification and recognition system of the present invention and is referred to by the general reference character 78. The system 78 is modified over the system 1 and is adapted for code matching to recognize a specific code of two passive elements as contrasted to recognizing a variety of codes. Those elements common to FIG. 2 carry the same reference numerals distinguished by a double prime designation. The two passive elements are represented by the two circuits 10A″ and 10B″. Specific applications of the system 78 include GO; NO-GO systems, e.g. key-and-lock combinations, in which a GO or ALLOW ENTRY signal is generated when there is a code match and a NO-GO signal is generated in the absence of a match between the passive code and the preselected internal code.

The frequency measurement network of the system 78 includes an internal preset recognition network 79 having two tuned circuits each tuned to a preset frequency representative of the desired frequencies of the circuits 10A″ and 10B″ and a coincidence detector network 80. The output of the detector 17″ extends to the network 80 which includes a pair of AND gates 81A and 81B, respectively. The input of the gates 81A and 81B are common to the detector 17″ and receive the pulse signal *i*. The output of the gates 81A and 81B are, respectively, common to a pair of latches 82A and 82B. The latches 82A and 82B are common to an AND gate 84 extending to an output terminal 86. The output of the detector 17'' is also common to a latch 95 extending to an AND gate 96. The AND gate 96 is also common to an inhibit circuit 97 extending to the terminal 86. The output of the AND gate 96 is common to a terminal 98. A mechanism 99 may be tied to the terminal 86 and a mechanism 100 tied to the terminal 98. The mechanism 99 may be adapted to represent the GO or ALLOW ENTRY function. The mechanism 100 may be adapted to represent the NO-GO or DO NOT ALLOW ENTRY function. An alarm mechanism, responsive to a NO-GO signal, may also be tied to the terminal 98 in the event a warning is desired when a passive circuit is brought within the proximity of the coil 13'', which passive circuit does not carry the desired resonant frequency.

The voltage controlled oscillator 21'' is common to a first tuned circuit 100A and a second tuned circuit 100B of the network 79. The tuned circuits 100A and 100B may be in any of various forms. For example, the circuits may be in the form of inductance-capacitance circuits, modulation discriminations, etc. tuned to preselected frequencies. The frequency circuits 100A and 100B extend to a pair of detectors 102A and 102B, respectively. A pair of logic drive amplifiers 104A and 104B are, common to the output of the detectors 102A and 102B respectively, and extend to the AND gates 81A and 81B. At a frequency equal to the resonance of the tuned circuit 100A, and gate 81A is half selected. If resonance occurs within the circuit 10A'' and manifests itself as a pulse from the detector 17'' at the resonant frequency of the tuned circuit 100A, then the AND gate 81A is fully selected and sets the latch 82A which half selects the AND gate 84. Similarly, there may be frequency resonance of the passive circuit 10B'' which coincides with the resonant frequency of the circuit 100B. Then the AND gate 81B is fully selected and sets the latch 82B which half selects the AND gate 84. Thus, the gate 84 is fully selected and the terminal 86 has a first signal which may represent a GO command.

The latch 95 is set by any pulse and half selects the AND gate 96. If the terminal 86 has a GO signal, the inhibit logic element 97 prevents the gate 96 from being fully selected. If a GO signal is not present on the terminal 86, then the gate 96 is fully selected and the terminal 98 carries a second command signal which may represent a NO-GO command. The GO and NO-GO command signals at the terminals 86 and 98 may be utilized to operate the output mechanisms 99 and 100. The latches 82A, 82B and 95 may be reset at the end of the ramp signal C.

FIG. 8 illustrates an alternative embodiment 79' of the preset recognition code network 79 of FIG. 7. In the embodiment 79' the signal C is applied to two voltage comparators 101A and 101B and compared against a preset fixed voltage V' applied at input terminals 103A and 103B of the comparators 101A and 101B. The output of the comparators 101A and 101B rises abruptly when the signal C exceeds the voltage V'. The abrupt change is converted to a pulse *q* by differentiating circuits formed by a capacitor 103A and a resistor 105A and by a capacitor 103B and a resistor 105B. The signals *q* are then common to the input of the coincidence detector network 80.

Figure 9:
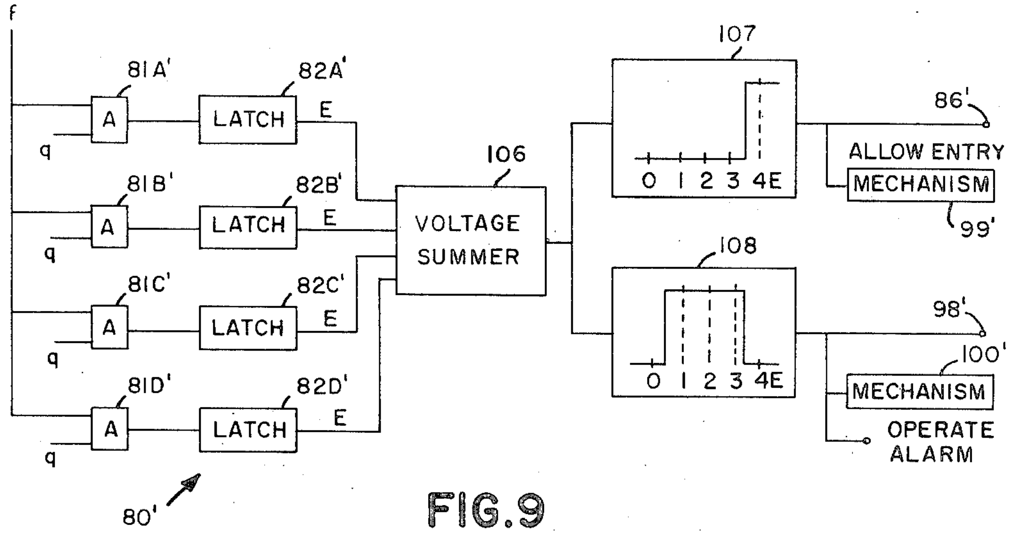
FIG. 9 illustrates an alternative embodiment of a coincidence detector network of FIG. 7 adapted to generate an alarm signal when a partial of the internal code is recognized.

FIG. 9 illustrates an alternative embodiment of a coincidence detector network 80' of the recognition network 78 of FIG. 7. The network 80' is adapted to evaluate the degree of coincidence of a preset code with a passive object. Those components of the network 80' common to FIG. 7 carry the same reference numerals distinguished by a single prime designation. The network 80' is adapted to generate a GO command signal when there is matching between a plurality of preset frequencies and coded frequencies of the passive object 5. The network 80' is adapted to generate a NO-GO signal when there is matching of one but less than all of the preset frequencies. Alarm signals are thus generated only when a part of the code is recognized but not necessarily when any pulse appears in signal *f*. For example, for illustrative purposes, a four code network is illustrated. Assuming the internal prerecognition network 79 comprises four tuned circuits to recognize four passive circuits of the desired objects to be recognized, the network 80' includes four AND gates 81A', 81B', 81C' and 81D'. Each of the gates 81A', 81B', 81C' and 81D' are common to the signal *f* and half selected by said signal *f*. The gates 81A', 81B, 81C' and 81D' respectively extend to the preset recognition network 79 and are individually adapted to respond to the signal *q* of the individual tuned circuits of the network 79. Each gate 81A', 81B', 81C' and 81D' is respectively common to a latch 82A', 82B', 82C' and 82D'. The latches each generate a voltage signal E when the respective associated AND gate is fully selected. The latches in turn extend to a voltage summer network 106A. The output of the summer 106A represents the sum of the voltage E received from the latches. The output of the summer network 106A extends to a voltage window comparator 107B and to a voltage window comparator 108C. The window comparator 107B is selected to generate a GO signal when the summed voltage is approximately 4E. The window comparator 108C is selected to generate a NO-GO signal when the summed voltage is approximately E-3E. In application, it may be desirable to set the window comparator 107B to be responsive to voltages exceeding 3½ E and the comparator 108C to be responsive within the range of ½E–3½E. Accordingly, in operation, a GO signal is generated when all four of the preset codes are matched and recognized. A NO-GO signal or alarm is activated when at least one of the preset codes is recognized but not all of the preset codes are simultaneously recognized. Exemplary applications include lock and key applications in which the NO-GO signal may serve to operate an alarm indicating that the security system is being tampered with by a passive key not carrying the proper code to generate a GO signal which would permit authorized access. When utilized as a sorting control, the NO-GO signal may be utilized to indicate that the sensed passive object falls within a certain coded classification other than the select code for generating a GO signal. Those objects generating a GO signal may be directed to a first channel for processing, those objects generating the NO-GO signal may be directed to another channel for further processing; and those objects failing to generate either a GO or NO-GO signal may be directed to a third channel for further processing.

Figure 10:
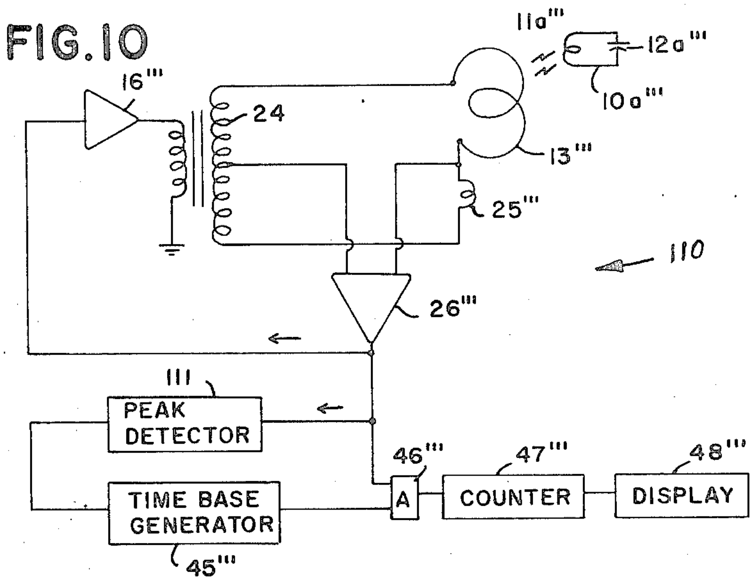
FIG. 10 illustrates a further embodiment of the present invention in the form of a spontaneous oscillation network adapted to generate oscillations coinciding with the resonant frequency of a passive object inductively coupled to said network.

FIG. 10 illustrates in block diagram form an alternative embodiment of an identification-recognition system, referred to by the general reference character 110 and incorporating the teachings of the present invention. Those components common to FIG. 2 carry the same reference numerals distinguished by a triple prime designation. The system 110 is adapted to spontaneously oscillate when the passive circuit 10A''' is brought within the vicinity of the sensing coil 13'''. The sense amplifier 26''' is connected back by positive feedback to drive the amplifier 16'''. Loop gain is typically less than unity so oscillations do not occur. In operation, a weak field exists about the coil 13''' due to spontaneous noise generation in the amplifier 16'''. When passive circuit 10''' is within the proximity of the sensing coil 13''', portions of the noise are phase shifted and reflected so that at certain frequencies there is positive feedback from the amplifier 26''' to the amplifier 16''' such that a gain greater than unity is realized. Oscillations result and build up to a measurable value. The frequency value of the oscillations is determined by the reactive characteristics of the passive circuit 10'''. The oscillation signals are detected by a peak detector 110 which, in turn, turns on the time base generator 45'''. The AND gate 46''' is excited and the counter 47''' measures the frequency. The count is displayed by the display 48'''. The system 110 provides an economical system of relatively simplified structure and provides minimal radiation when not measuring a passive circuit 10'''.

Figure 11:
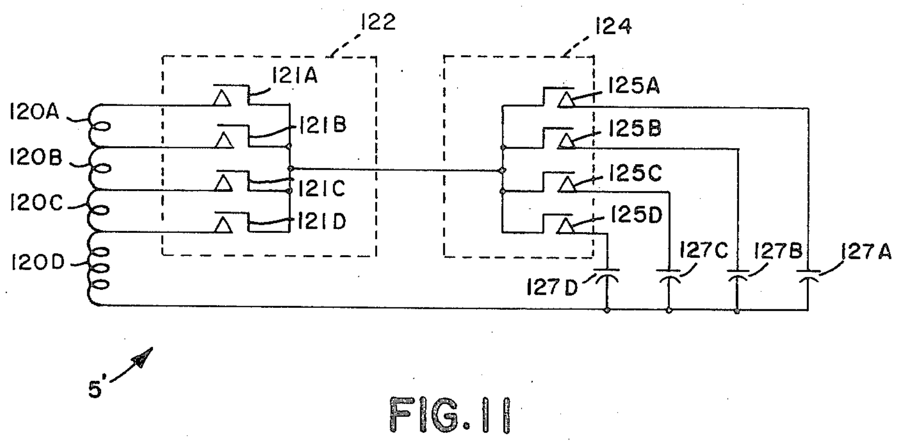
FIG. 11 illustrates a passive object tag in which the inductive components and capacitive components may be modified to form a "master key" or modifiable identification tag.

FIG. 11 illustrates an alternative passive network 5' adapted to provide versatility in the selection of codes. For example, in lock and key applications, it is commonly desirable that authorized persons have "a master key" to permit them to have access to a plurality of different areas without the necessity of carrying a specific key for each lock. In sorting or identification systems it is desirable that the passive object have the capability of being reusable without being limited to only one code for each use. The passive network 5' is adapted to include select means for selectively varying the coded resonant frequency. The network 5' carries a plurality of series connected inductors 120A, 120B, 120C and 120D, respectively joined to the contacts 121A, 121B, 121C and 121D joined in parallel to a first switching means 122. The switching means 122 extends to a second switching means 124 having a plurality of contacts 125A, 125B, 125C and 125D. Each of the contacts 125A, 125B, 125C and 125D respectively extend to a capacitor 127A, 127B, 127C and 128D. Accordingly, any of a plurality of combinations of inductors and capacitors may be selected through the switching means 122 and 124 thereby providing for the selection of any one of a plurality of select resonant frequencies.

I claim:

1. An electronic identification system for identifying electrically passive objects, the system comprising, in combination:

a passive electrical object including a passive electrical circuit having a coded resonant frequency; and an active electrical signal generation network including a sensing coil for producing an electromagnetic field within the proximity of the coil responsive to an alternating current signal delivered to the coil; an oscillator means engaged to said sensing coil and adapted to repetitively generate alternating current signals over a select frequency range to said sensing coil, said sensing coil being movable relative to the passive electrical object and adapted for inductive coupling with the passive electrical object when said object is within the proximity of said sensing coil, detector means for detecting changes in the field characteristics of said sensing coil as the frequency of the generated field approaches the coded resonant frequency of the passive object, the detector means being adapted to generate a signal of varying amplitude representative of said field characteristics of said sensing coil, said detector means being further adapted to generate time base signals responsive to the detected resonant frequency of the passive object; and measurement means responsive to the oscillator means and the detector means for counting the cycles of the oscillator means during the time intervals of said time base signals.

2. The system of claim 1 in which the active electrical signal generation network includes an isolation network to isolate the oscillator means from the electrical load on said sensing coil.

3. The system of claim 1 in which said detector means includes a first detector adapted to generate an output signal which signal assumes a positive value when the phase of the oscillator frequency value is on one side of the resonant frequency of the passive object and a negative value when the phase of the oscillator frequency value is on the other side of the resonant frequency.

4. The system of claim 3 in which said detector means further includes a second detector in the form of a crossover detector adapted to respond to the output of said first detector and a signal of a preset absolute level, said crossover detector being adapted to generate a pulse having a time duration commencing when said positive signal of said first detector exceeds said absolute level and terminating when said negative signal of said first detector exceeds said absolute value.

5. The system of claim 3 in which said detector means further includes a second detector in the form of a differentiator network adapted to respond to the output of said first detector and to generate a pulse as the output signal as said first detector passes through a zero reference voltage level.

* * * * *